United States Patent
Conley

(10) Patent No.: US 10,505,741 B1
(45) Date of Patent: Dec. 10, 2019

(54) CRYPTOGRAPHICALLY PROVABLE DATA CERTIFICATION AND PROVENANCE

(71) Applicant: Amazon Technologies, Inc., Seattle, WA (US)

(72) Inventor: Myles Conley, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 113 days.

(21) Appl. No.: 15/280,852

(22) Filed: Sep. 29, 2016

(51) Int. Cl.
  *H04L 9/32* (2006.01)
  *H04L 29/06* (2006.01)
  *H04L 9/08* (2006.01)

(52) U.S. Cl.
  CPC .......... *H04L 9/3247* (2013.01); *H04L 9/083* (2013.01); *H04L 9/3242* (2013.01); *H04L 9/3263* (2013.01); *H04L 63/0428* (2013.01); *H04L 63/0823* (2013.01); *H04L 63/123* (2013.01)

(58) Field of Classification Search
  CPC .......... G06F 21/10; G06F 21/64; G06F 21/33; H04L 9/3247; H04L 9/3263; H04L 63/0823; H04L 63/0428; H04L 9/083; H04L 63/123; H04L 9/3242
  See application file for complete search history.

(56) References Cited

U.S. PATENT DOCUMENTS

| | | | | |
|---|---|---|---|---|
| 2001/0011350 A1* | 8/2001 | Zabetian | ............ | G06Q 20/3821 713/176 |
| 2001/0029482 A1* | 10/2001 | Tealdi | ............ | G06Q 20/105 705/38 |
| 2002/0138735 A1* | 9/2002 | Felt | ............ | G06Q 20/3829 713/176 |
| 2005/0160095 A1* | 7/2005 | Dick | ............ | H04L 63/0428 |
| 2005/0193196 A1* | 9/2005 | Huang | ............ | G06F 21/6218 713/166 |
| 2006/0101269 A1* | 5/2006 | Moskowitz | ............ | G06F 21/10 713/176 |
| 2006/0161781 A1* | 7/2006 | Rice | ............ | G06F 21/645 713/176 |
| 2006/0224895 A1* | 10/2006 | Mayer | ............ | G06Q 20/389 713/176 |
| 2008/0243528 A1* | 10/2008 | Kwak | ............ | G06Q 10/10 705/1.1 |
| 2010/0313032 A1* | 12/2010 | Oswalt | ............ | H04L 63/123 713/176 |

(Continued)

*Primary Examiner* — Cheng-Feng Huang
(74) *Attorney, Agent, or Firm* — Davis Wright Tremaine LLP

(57) ABSTRACT

A data notarization service receives a request to provide certified data to a recipient. The request may be received from the recipient or from an authorizing entity. In response to the request, the data notarization service acquires the requested data, and applies one or more selected certifications to the requested data to produce certified data. The data notarization service signs the certified data with a notarization. The certifications are selected based at least in part on certification preferences specified by the recipient, and the notarization is applied in accordance with notarization preferences specified by the recipient. The notarized and certified data is provided to the recipient in accordance with an authorization received by the authorizing entity. The authorization may impose limits on when the data is provided and the content of the data provided.

20 Claims, 11 Drawing Sheets

(56) References Cited

U.S. PATENT DOCUMENTS

| | | | | |
|---|---|---|---|---|
| 2013/0152174 A1* | 6/2013 | Raley | ............... | G06F 21/31 |
| | | | | 726/4 |
| 2013/0297943 A1* | 11/2013 | Hackler | ............ | H04L 9/3247 |
| | | | | 713/178 |
| 2013/0311772 A1* | 11/2013 | Etheridge | ......... | H04L 9/3247 |
| | | | | 713/156 |
| 2014/0168201 A1* | 6/2014 | Jung | ............... | G06Q 10/087 |
| | | | | 345/214 |
| 2015/0026478 A1* | 1/2015 | Raduchel | .......... | H04L 9/3247 |
| | | | | 713/178 |
| 2015/0188715 A1* | 7/2015 | Castellucci | ...... | G06F 16/1734 |
| | | | | 713/178 |
| 2015/0381624 A1* | 12/2015 | Reiter | ............ | H04L 63/0428 |
| | | | | 713/168 |

\* cited by examiner

CRYPTOGRAPHICALLY PROVABLE DATA CERTIFICATION AND PROVENANCE

BACKGROUND

In many transactions, authenticated information must be exchanged between the parties to the transaction. Traditionally, this is been accomplished by exchanging tangible paper documents that are been notarized, certified, signed or countersigned in accordance with a protocol agreeable to the parties. As increasing amounts of paper-based information is converted into a digital form, additional techniques have been devised to notarize, certify, sign, or indicate the authenticity of the digital information. However, difficulties arise in identifying a workable certification process that is both agreeable to all parties to the transaction and also technically feasible for the provider of the data. For example, the recipient of the data may require multiple certifications, notarizations, or signatures based on conflicting requirements imposed by different legal jurisdictions, governments, or regulatory processes. If an acceptable digital certification process cannot be determined, the parties may have to resort to a paper-based process that is both cumbersome and expensive. For at least this reason, providing certified digital data is an important problem.

BRIEF DESCRIPTION OF THE DRAWINGS

Various techniques will be described with reference to the drawings, in which.

DETAILED DESCRIPTION

Figure 1:
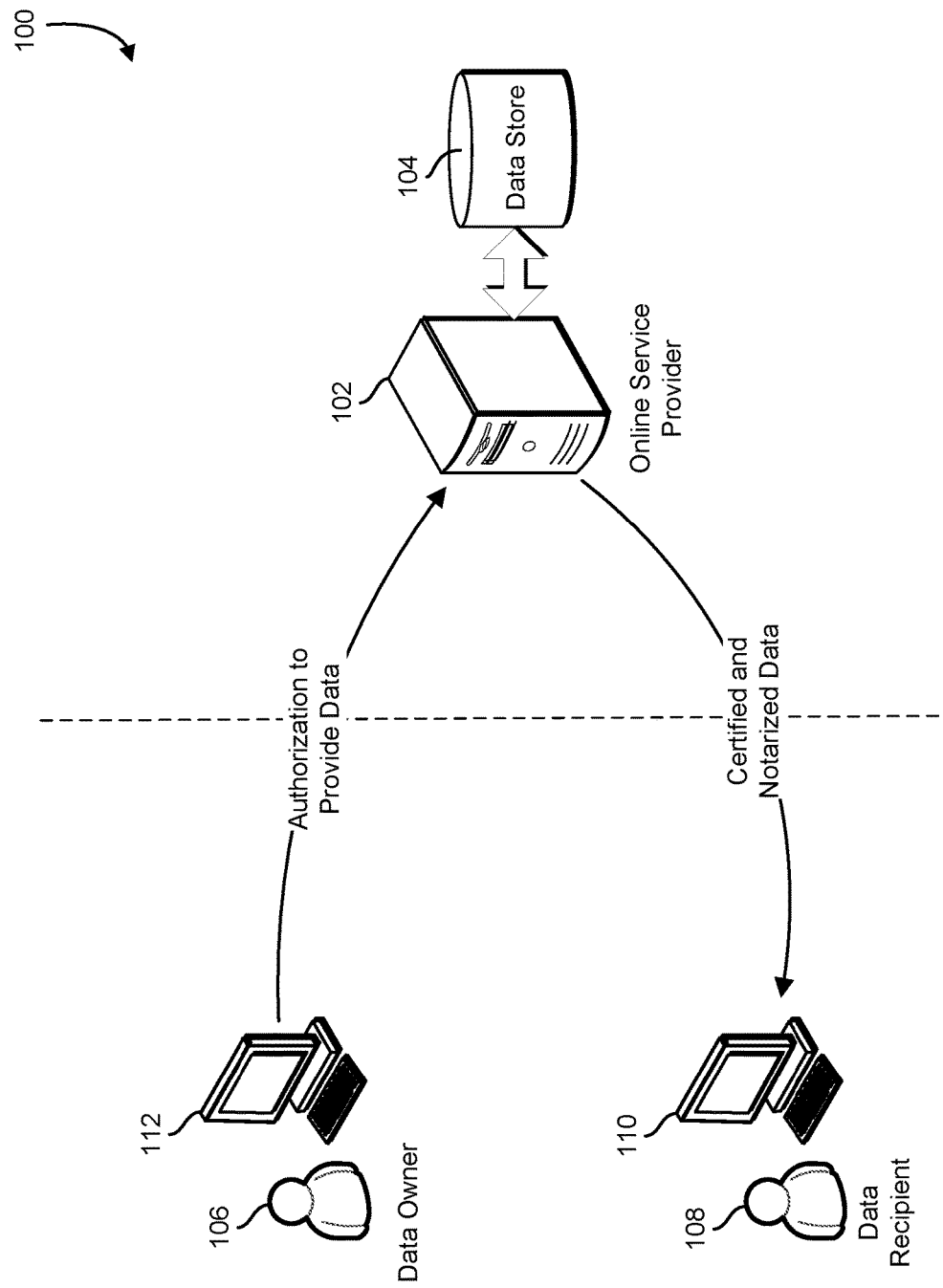
FIG. 1 shows an illustrative example of an environment in which various embodiments may be practiced.

The current document describes a data service that provides data associated with a data owner to a recipient authorized by the data owner in accordance with a set of certification and notarization requirements specified by the recipient. In order to receive data from the data service, the recipient registers with the data service. As part of a registration process, the recipient provides identifying information, data certification preferences, and data notarization preferences. The identifying information may include a digital certificate, biometric information, validation of personal identifying information, multifactor authentication, a digital signature, a username/password combination, or other credentials. The data service uses the identifying information to authenticate the identity of the recipient. The certification preferences provided by the recipient identify one or more data certification regimes accepted and/or required by the recipient. The certification regimes may include government certifications, financial certifications, legal certifications, regulatory certifications, or other certifications. The notarization preferences specify one or more digital signature types that the recipient is able to accept as verification of the certification by the data service.

The data owner provides an authorization to the data service that allows the data service to provide data to one or more recipients. The authorization identifies the data to be provided, and specifies the one or more recipients authorized to receive the data. The data owner may attach one or more conditions to the authorization. In some examples, the conditions restrict the data provided to a particular snapshot of the data acquired at a particular time. In another example, the conditions specify an expiration for the authorization. The expiration may be based on a particular point in time, a particular number of data retrievals, or a particular characteristic of the data itself. In one example, the authorization expires if a particular piece of negative data is added to the authorized data set. A particular piece of negative data can be a missed payment, a negative balance, a bad customer review, an accident report, a court judgment, or other piece of data that the owner of the data may not wish to release to the recipient.

In some implementations, the data provider provides data to a recipient in response to a request received by an owner of the data. The data owner submits a request to the data provider that identifies data to be provided and designates a recipient. In response to the request, the data provider retrieves the data, and identifies one or more certifications associated with the designated recipient. The data provider acquires the one or more certifications, and applies the certifications to the data. Various data certifications may be applied by the data provider, by a third-party, or by the owner of the data. If a particular data certification is applied by an entity other than the data provider, the data provider may verify the particular data certification before applying a notarization. As a result of having acquired the one or more certifications and applying the certifications to the data, the data provider determines a preferred notarization type specified by the recipient, and applies the notarization to the certified data. In some examples, the notarization is a digital signature using a private key that is associated with the public digital certificate. In another example, the data provider may apply more than one preferred notarization to the certified data. In many situations, data recipients find that data certifications are difficult to verify, and may choose to rely on the notarization of the data provider as sufficient proof that the data certifications are valid.

In another implementation, the data provider provides data to a recipient in response to a request received from the recipient. The recipient sends a request for data to the data provider that specifies one or more data certifications and at least one preferred notarization type. The data provider identifies an owner associated with the requested data, and requests an authorization from the owner that allows the data provider to provide the data to the recipient. If the data owner provides the authorization, the data provider retrieves the data, acquires and applies the requested data certifications, and applies the preferred notarization to the certified data. The certified and notarized data is provided to the recipient.

In yet another implementation, a data owner requests a certified and notarized export of the data from the data provider. In response to the request, the data provider retrieves the data acquired and applies one or more certifications requested by the data owner. The certified data is notarized by the data provider with a notarization, and the certified and notarized data is returned to the data owner. The data owner may forward the certified and notarized data to a third-party such as a bank, employer, court, or other entity, and the third party may validate the individual certifications and/or validate the notarization of the data provider to prove that the data is legitimate.

Certifications may be used to indicate that data conforms to a corresponding standard, format, or has a certain characteristic. Information indicating a certification may include digital signatures, electronic signatures, seals, signature images, tags, checksums, watermarks, or other indications that a document or data is authentic, original, uncorrupted, approved, reviewed, or valid. Certifications may be associated with a government entity, municipality, jurisdiction, court, individual, corporation, judge, regulatory agency, financial entity, bank, or other entity. Some certifications may be applied by the data provider on behalf of the other entity. Other certifications may be applied by another entity and verified by the data provider. A notarization is a digital signature or other verifiable indication that is associated with the data provider that is applied to the data and certifications. In some situations, a recipient may use the notarization to verify that the certifications are present and valid.

In some implementations, the data service is associated with an online merchant platform. Over time, the online merchant platform collects data associated with particular merchants, customers, suppliers, and other entities. Government agencies, financial institutions, courts, and other legal entities register with the data service to receive information from the operator of the online merchant platform. In order to qualify for a line of credit, loan, or other financial transaction, a data owner such as a merchant may wish to provide sales information, inventory information, or other business health information controlled by the online merchant platform to a financial institution registered with the data service. The merchant provides an authorization to the data service that identifies the financial institution and the data to be provided. The data service authenticates the identity of the merchant, and based on information provided by the financial institution during registration with the data service, acquires one or more certifications for the requested data. The certified data is then signed in accordance with the notarization preferences indicated by the financial institution, and the signed and notarized data is provided to the financial institution.

FIG. 1 shows an illustrative example of an environment in which various embodiments may be practiced. An environment 100 shows an online service provider 102 that acquires and retains data in a data store 104. The online service provider 102 may be an online merchant platform, a lending platform, an auction platform, an electronic brokerage platform, a search engine, a network-connected vehicle or any online service that acquires and retains data associated with users or clients of the online service. The online service provider 102 may be implemented using a computer server, a computer server cluster, a virtual computing system, or an online computing service provider. In various implementations, as a result of the operation, the online service provider 102 generates information such as purchase-history information, merchant-reliability information, credit information, payment-history information, and product-return information that is stored and maintained in the data store 104. The online service provider 102 includes a data notarization service that makes some or all of the data retained in the data store 104 available to outside entities subject to an authorization provided by a data owner 106. In various examples, the data owner 106 may be a customer, merchant, supplier, or business partner associated with the data.

To receive data from the data notarization service, a data recipient 108 registers with the online service provider 102 via a recipient client 110. The recipient client 110 may be a personal computer system, mobile device, tablet computer system, or other computer system that executes client software to present a user interface to the data recipient 108. In some implementations, the client software is a web browser. Using the recipient client 110, the data recipient 108 registers with the online service provider 102. The data recipient 108 provides authentication information to the online service provider 102 that allows the online service provider 102 to verify the identity of the data recipient. In some examples, the authentication information may include a confirmation number sent to the data recipient 108 via postal mail, text message, or email. In another example, the authentication information may include biometric information such as a photograph, fingerprint, or retina scan. In yet another example, the authentication information may include verifiable personal information such as a previous address, past interaction with the online service provider 102, a password, or a passcode. During the registration process, the data recipient 108 may identify one or more data certification types, and one or more data notarization types that are acceptable to the data recipient 108. In some implementations, the data recipient 108 specifies a plurality of certifications with an associated preference order. In another implementation, the data recipient 108 specifies a plurality of notarization types with an associated preference order. The online service provider 102 retains the information provided during the registration process.

The data notarization service of the online service provider 102 may provide data to the data recipient 108 in response to a request received from the data recipient 108 or the data owner 106. If the data notarization service receives the request from the data recipient 108 via the recipient client 110, the data notarization service requests an authorization from the data owner 106 via an owner client 112. The data owner 106 submits an authorization to the data notarization service via the owner client 112. The authorization identifies the particular data in the data store 104 to be provided to the data recipient 108, and may include one or more conditions associated with the authorization.

The data notarization service authenticates the authorization received from the data owner 106, and using information retained during the registration process, identifies one or more certifications and one or more notarization types that are acceptable to the data recipient 108. If a preference order is specified, the online service provider 102 selects a particular certification type or notarization type in accordance with the specified preferences of the data recipient 108. The particular certification type or notarization type may be selected by identifying a most preferred certification type or notarization type that is attainable by the data notarization service. The data notarization service acquires the particular certification and applies the particular certification to the data requested by the data recipient 108. Some certifications may be acquired and applied by the data notarization service. Other certifications may be acquired by submitting the data to a third-party, and receiving certified data in exchange. After the data notarization service verifies that the particular certification has been received and correctly applied to the data, a notarization is applied to the certified data in accordance with the particular notarization type selected. The notarization is a digital signature applied by the data notarization service. In some examples, the notarization is a digital signature applied using a private key associated with a digital certificate of the online service provider.

After the data is certified and notarized in accordance with the preferences of the data recipient 108, the certified and notarized data is provided to the data recipient 108 via the recipient client 110. If the data notarization service is unable to provide a data certification that is acceptable to the data recipient 108, the data notarization service reports an error to the data recipient 108 via the recipient client 110. In many situations, the data recipient 108 may have difficulty or be unable to easily verify that the particular certifications on the data are valid. In such situations, the data recipient 108 may verify the notarization to ensure that the particular certifications applied by the data notarization service have been validated by the online service provider 102.

Figure 2:
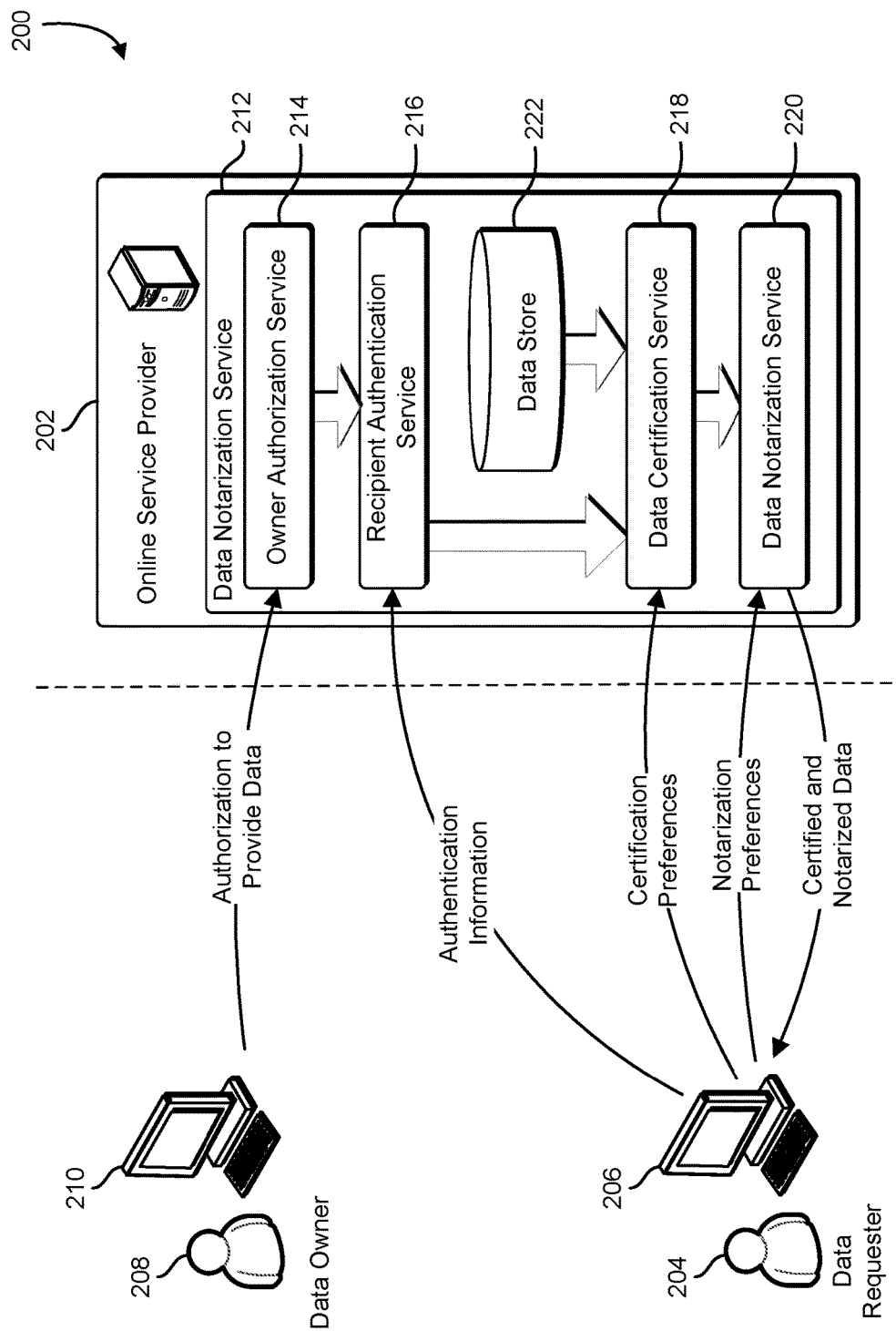
FIG. 2 shows an illustrative example of an environment in which a data owner authorizes a data notarization service to provide data to a data requester.

FIG. 2 shows an illustrative example of an environment in which a data owner authorizes a data notarization service to provide data to a data requester. A system diagram 200 shows an online service provider 202 that provides certified and notarized data to a data requester 204 via a requester client 206. Using an owner client 210, a data owner 208 authorizes the release of the certified and notarized data to the data requester 204. The requester client 206 and the owner client 210 are computer systems containing client software that enables communication with the online service provider 202. In some implementations, the client software is a web browser. The online service provider 202 includes a data notarization service 212. The requester client 206 implements a user interface that allows the data requester 204 to interact with the data notarization service 212. The owner client 210 implements a user interface that allows the data owner 208 to interact with the data notarization service 212. The data notarization service 212 is an online service hosted on a computer system that is under the control of the online service provider 202. In some implementations, the data notarization service 212 is a network-accessible service hosted on the same computer system as the online service provider 202. In another implementation, the data notarization service 212 is an internal service on the online service provider 202, and is accessible to the data requester 204 and the data owner 208 via a proxy running on the online service provider 202. The data notarization service 212 includes an owner authorization service 214, a recipient authentication service 216, a data certification service 218, and a data notarization service 220. A data store 222 retains data related to the operation of the online service provider 202 and associated with the data owner 208.

Certified and notarized data is provided to the data requester 204 in response to a request for data submitted by the data requester 204 via the requester client 206. The data requester 204 establishes communications with the recipient authentication service 216 via the data notarization service 212. Using the requester client 206, the data requester 204 provides authentication information to the recipient authentication service 216. The authentication information may include a username and password, a digital certificate, a digital signature, a confirmation code, verifiable personal information, or other information that may be used to confirm the identity of the data requester 204.

The data requester 204 provides a set of certification requirements to the data certification service 218. The certification requirements may be provided as part of a request for data, or as part of a registration process performed by the data requester 204. In some examples, the certification requirements may be provided to the data notarization service 212 by presenting a form provided by the data certification service 218 to the data requester 204 using a web browser on the requester client 206. In some implementations, the set of certification requirements is a list of certification types that are acceptable to the data requester 204. In another implementation, the set of certification requirements includes a preference ordering of certification types that are acceptable to the data requester 204. In yet another implementation, the set of certification requirements includes a collection of certification types, and a number of certifications necessary to be accepted by the data requester 204. In yet another implementation, the set of certification requirements includes a collection of certification types, a certification weight for each certification type in the collection of certification types, and a total weight of certifications required to be acceptable to the data requester 204.

The data requester 204 provides a set of notarization preferences to the data notarization service 220. The notarization preferences may be provided as part of a request for data or as part of a registration process performed by the data requester 204. The notarization requirements may be provided to the data notarization service 212 by presenting a form provided by the data notarization service 220 to the data requester 204 using a web browser on the requester client 206. In some implementations, the notarization requirements are provided in the form of a list of digital signature types that are verifiable by and acceptable to the data requester 204. In another implementation, the notarization requirements include a preference order of the digital signature types. In yet another implementation, the set of notarization requirements includes a collection of notarization types, and a number of notarizations necessary to be accepted by the data requester 204. In yet another implementation, the set of notarization requirements includes a collection of notarization types, a notarization weight for each notarization type in the collection of notarization types, and a total weight of notarizations required to be acceptable to the data requester 204.

In some examples, the requester client downloads and applet, plug-in, or executable client from the data notarization service 212. The executable client is installed on the requester client 206 and executed causing the user interface to be presented to the data requester 204. The user interface allows the data requester 204 to enter a set of certification and notarization preferences. After entering the preferences, the executable client transmits the preferences to the data notification service 212, and the preferences are stored in the data store 222. In one implementation, the executable client is a web form downloaded from the data notarization service 212 to the requester client 206. The web form is executed by a browser on the requester client 206, and the browser presents a corresponding data entry form to the data requester 204. The data requester 204 enters the certification and notarization preferences into the form, and submits the form via the browser. The browser uploads the information from the form to the data notarization service 212, and the information is stored in the data store 222 in association with information that identifies the data requester 204.

As a result of receiving a request for data from the data requester 204, the data notarization service 212 identifies an owner associated with the data, and sends an authorization request to the data owner via the owner client 210. The authorization request identifies the data being requested, and may also identify the data requester 204. The data owner 208 may respond to the authorization request by denying the request. If the data owner 208 responds to the request by denying the request, the request for data from the data requester 204 will be denied. If the data owner 208 approves the request for data, the data owner 208 uses the owner client 210 to provide an authorization to the owner authorization service 214. The authorization may include authentication information, and one or more conditions of authorizing the request. In various implementations, the authentication information may include a username and password, a digital signature, biometric information, a one-time use code provided via a cryptographic time-based generator, or via an independent communication channel to the data owner 208, or other identifying information. The owner authorization service 214 verifies the authentication information to confirm that the origin of the authorization is the data owner 208.

If the authorization includes a condition, the data notarization service 212 verifies the condition is satisfied before fulfilling the request for data submitted by the data requester 204. In some examples, the condition identifies a particular snapshot time for the data. If a particular snapshot time is specified as a condition, the online service provider 202 captures the requested data at the particular snapshot time and saves a copy of the captured data. If the data requester 204 requests the data at a later time, the data notarization service 212 provides the copy of the captured data even if the identified data has been changed since the particular snapshot time. In another example, the condition identifies an expiration time for the authorization. If the data requester 204 requests the data at a time after the expiration time, the request for data will be denied. In yet another example, the condition specifies a number of times that data may be provided. If the data is requested more than the specified number of times, requests in excess of the specified number of times will be denied by the data notarization service 212. The data owner 208 may specify more than one condition that needs to be satisfied to authorize the request for data.

The certified and notarized data is produced by the data notarization service 212 in accordance with the information flow illustrated in FIG. 2. The owner authorization service 214 received the authorization from the data owner 208 and determines that the authorization received via the owner client 210 originated from the data owner 208. The owner authorization service 214 ensures that any conditions provided by the data owner 208 with the authorization are satisfied. If the conditions are satisfied, and the authorization is authentic, the recipient authentication service 216 authenticates the data requester 204 to ensure that the request for data originates from the data requester 204. If the data request is authentic, the data certification service 218 examines the certification preferences provided by the data requester 204 and selects a set of certifications that are acceptable to the data requester 204 and supportable by the data certification service 218. The selected set of certifications are acquired and applied to the data which is retrieved from the data store 222. The certified data is provided to the data notarization service 220. The data notarization service 220 uses the notarization preferences provided by the data requester 204 to select one or more notarization types that are acceptable to the data requester 204 and supportable by the data notarization service 220.

The certified and notarized data is returned to the data requester 204 by the data notarization service 212 via the requester client 206. In various implementations, the data notarization service 212 sends a notification to the owner client 210 indicating that the data has been provided to the data requester 204.

Figure 3:
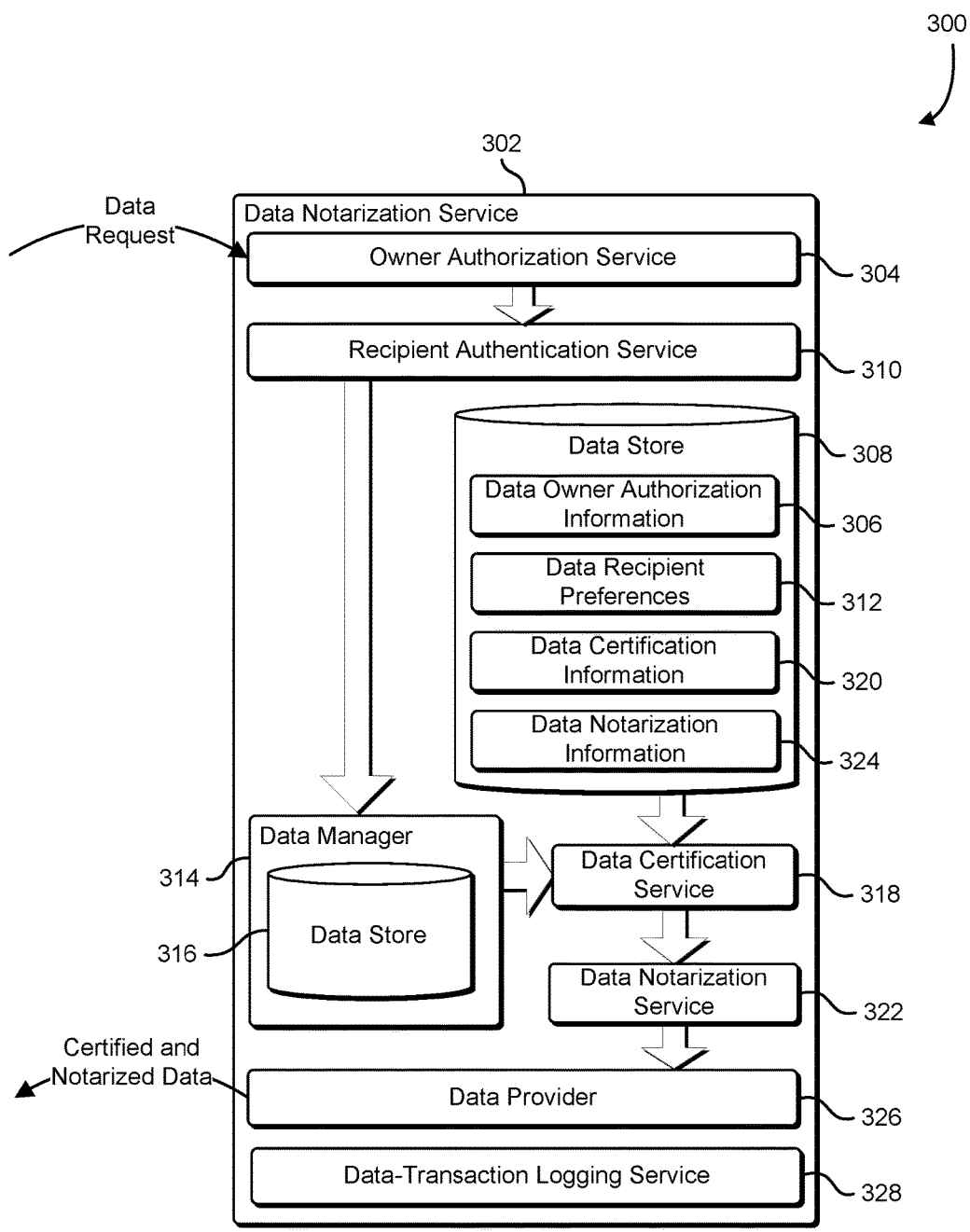
FIG. 3 shows an illustrative example of a data notarization service that provides data belonging to a data owner to a requester in accordance with certification and signature requirements specified by the requester.

FIG. 3 shows an illustrative example of a data notarization service that provides data belonging to a data owner to a requester in accordance with certification and signature requirements specified by the requester. A block diagram 300 illustrates an architecture of a data notarization service 302. The data notarization service 302 includes a number of internal services and data stores that support the functions of the data notarization service 302. The internal services are implemented as software components that interact with each other via messaging interfaces, procedure call interfaces, or application programming interfaces. The data stores may be implemented using a combination of one or more storage devices such as disk drives, nonvolatile semiconductor memory, volatile semiconductor memory, flash memory, or removable computer readable media. In some implementations, a data store may be implemented using an external data storage service such as a network connected disk drive, or online storage service.

An owner authorization service 304 processes authorizations received from data owners or other entities that control the release of data from the data notarization service 302. When the owner authorization service 304 receives an authorization, the owner authorization service 304 acquires authentication information from the entity supplying the authorization, and uses the authentication information to verify the identity of the entity supplying the authorization. The owner authorization service 304 confirms that the data being approved for release is under control of the entity providing the authorization. In some examples, the owner authorization service 304 queries a security service associated with an online service provider to determine whether the data being approved for release is under the control of the entity. If the owner authorization service 304 determines that the received authorization is valid, the owner authorization service 304 adds the authorization information to a set of stored owner authorization information 306 maintained within a data store 308.

A recipient authentication service 310 processes registration information submitted by potential data recipients. In order to receive information from the data notarization service 302, a potential recipient submits registration information to the recipient authentication service 310. The registration information includes information usable by the recipient authentication service 310 to verify the identity of the potential recipient. The recipient authentication service 310 verifies the identity of the potential recipient and collects information describing the certification and notarization preferences of the potential recipient. In some examples, the recipient authentication service 310 receives the certification and notarization preferences of the potential recipient with the registration information submitted by the potential recipient. In another example, the recipient authentication service 310 solicits the certification and notarization preferences from the potential recipient after verifying the identity of the potential recipient. The certification and notarization preferences of the potential recipient may be solicited by sending an HTML form to a client computer system operated by the potential recipient. The HTML form presents a number of certification and notarization options that are supported by the data notarization service 302. The potential recipient selects one or more certification and notarization options on the HTML form and submits the completed form to the recipient authentication service 310. After acquiring the certification and notarization preferences of the potential recipient, the certification and notarization preferences are added to a set of data recipient preferences 312 maintained in the data store 308.

The data notarization service 302 includes a data manager 314. The data manager 314 maintains a data store 316 that retains data generated by an online service provider associated with the data notarization service 302. In some examples, the online service provider is a merchant platform, and the data includes customer satisfaction information, sales information, customer review information, credit information, inventory information, and other business data. When a request for information is received by the data notarization service 302, the request for information specifies a subset of the data in the data store 316. The data manager 314 maintains the data in association with information that identifies an owner or responsible individual for the data. When a request for information is received by the data notarization service 302, the data manager 314 uses the information to identify one or more data owners or controlling entities from which authorization must be received before providing the requested data to the requester. The data manager 314 identifies the data owners to the owner authorization service 304 which acquires the corresponding authorizations.

The data identified in the data request is retrieved by the data manager 314 and provided to a data certification service 318. The data certification service 318 identifies the intended recipient of the data, and searches the set of data recipient preferences 312 to identify the certification preferences of the intended recipient. The data certification service 318 queries a set of data certification information 320 maintained on the data store 308 to identify the set of data certifications that are supportable by the data notarization service 302. Using the certification preferences of the intended recipient and the set of identified data certifications that are supportable, the data certification service 318 selects a set of data certifications to be acquired and applied to the data identified in the data request. The set of data certifications is selected at least in part by limiting the selected certifications to those certifications that are supportable by the data notarization service 302. If the certification preferences of the intended recipient include a preference order, the data certification service 318 selects the most preferred certification types from the set of data certification types supported by the data notarization service 302. For each of the selected certification types, the data certification service 318 queries the data certification information 320 in the data store 308 to retrieve information describing how each certification is acquired and applied to the data. The information describing how each certification is acquired may include a URL to an online service that acquires the certification, a cryptographic key used for applying the certification, or executable instructions that, when performed, acquire and apply the certification to the data. The data certification service 318 acquires and applies each selected certification to the data, and forwards the certified data to a data notarization service 322.

The data notarizing service 322 receives the certified data, and identifies the intended recipient of the certified data. Using the identity of the intended recipient, the data notarizing service 322 queries the set of data recipient preferences 312 to identify the notarization preferences of the intended recipient. The data notarizing service 322 queries a set of data notarization information 324 in the data store 308 to identify the set of notarizations supported by the data notarization service 302. Using the notarization preferences of the intended recipient and the set of notarizations supported by the data notarization service 302, the data notarization service 302 selects one or more notarizations to apply to the certified data. The notarizations are selected in part by determining a set of notarizations that are both supported by the data notarization service 302 and acceptable to the intended recipient of the certified data. If the intended recipient provides a preference order of notarizations, the most preferred notarizations are selected from the set of notarizations that are both supported by the data notarization service 302 and acceptable to the intended recipient. For each selected notarization, data notarizing service 322 queries a set of data notarization information 324 in the data store 308, and retrieves information describing how the notarization may be applied to the certified data. The information may include a cryptographic key for applying the notarization, a reference to a hardware security module ("HSM") containing a cryptographic key used for applying the notarization, a reference to an online service that applies the notarization, or a set of instructions that, when executed, apply the notarization to the certified data. The notarization information 324 may include information that allows the data notarizing service 322 to identify and validate the identity of a corresponding notarizing entity. The data notarizing service 322 applies the selected notarizations to the certified data and forwards the notarized and certified data to a data provider 326.

The data provider 326 receives the notarized and certified data from the data notarizing service 322 and provides the notarized and certified data to the intended recipient. The notarized and certified data may be provided to the intended recipient is a response to the request for data submitted to the data notarization service 302 using a cryptographically protected secure network connection. In some implementations, a new cryptographically protected secure network connections established between the data notarization service 302 and the intended recipient, and the intended recipient verifies their identity using a digital certificate signed by a third-party certificate authority.

The data notarization service 302 includes a data transaction logging service 328. The data transaction logging service 328 interacts with the owner authorization service 304, the recipient authentication service 310, and the data provider 326 to maintain a record of requests received and fulfilled by the data notarization service 302. In some implementations, information maintained by the data transaction logging service 328 is provided to the data owner when a request for data is fulfilled by providing notarized and certified data to an intended recipient.

Figure 4:
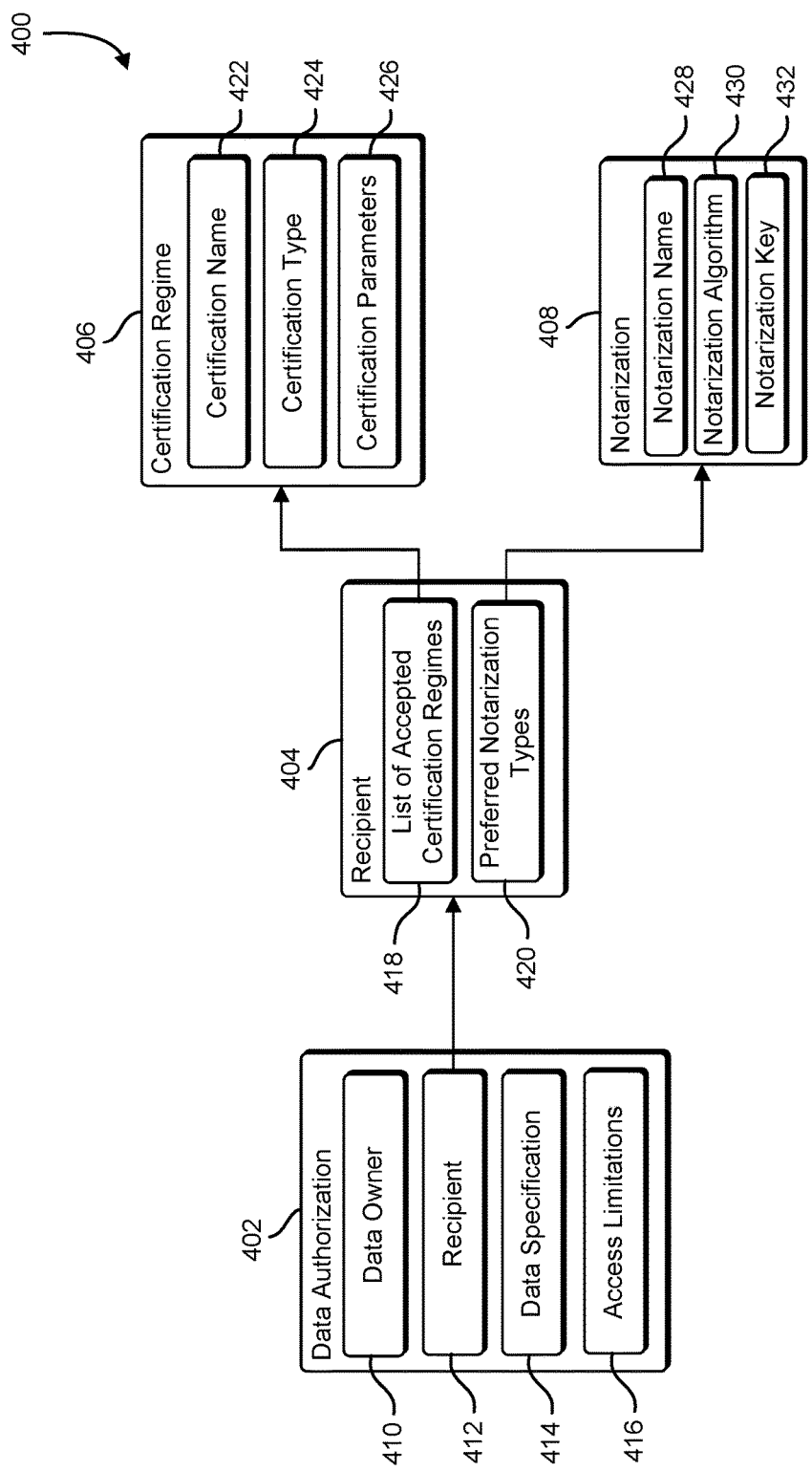
FIG. 4 shows an illustrative example of a data structure used by a data provider to track requests for certified and notarized data.

FIG. 4 shows an illustrative example of a data structure used by a data provider to track requests for certified and notarized data. A data diagram 400 includes a data authorization record 402, recipient record 404, a certification regime record 406, and a notarization record 408. The data authorization record 402 includes a data owner field 410, a recipient field 412, a data specification 414, and a set of access limitations 416. The data owner field 410 includes information that identifies an entity that owns or exercises control over the data associated with the data authorization record 402. The data owner field 410 may contain a user ID, a username, a legal name, a tax number, or cryptographic key associated with the data owner. The recipient field 412 contains information that identifies the intended recipient of the certified and notarized data. The intended recipient of the certified and notarized data may be identified using a username, user ID, legal name, digital certificate, cryptographic key, or other identifier. The data specification 414 identifies the data to be provided to the recipient. In various examples, the data specification 414 may contain a list of files, a memory pointer and an associated length, a directory specification, or list file pointers. The set of access limitations 416 may include zero or more individual access limitations in a list, array, or other collection. Each access limitation may specify an expiration, data condition, snapshot time, data pull limitation, or other limitation that qualifies the data authorization associated with the data authorization record 402.

In some implementations, the data provided to the intended recipient is financial health information and may include a credit score, a payment history, an inventory history, and order backlog information. In various examples, an access limitation may be included in the set of access limitations 416 that revokes the data authorization if the credit score in the data provided to the intended recipient is less than the threshold value specified in the limitation. In another example, an access limitation is included in the set of access limitations 416 that revokes the data authorization when the order backlog falls below a threshold amount. In yet another example, an access limitation is included in the set of access limitations 416 that revokes the data authorization when the payment history indicates a late payment, or an account balance falls below a threshold level.

The recipient field 412 in the data authorization record 402 identifies a recipient record 404. The recipient record 404 includes a list of accepted certification regimes 418, and a list of preferred notarization types 420. The list of accepted certification regimes 418 identifies one or more certification regimes that are acceptable to the recipient associated with the recipient record 404. The list of preferred notarization types 420 identifies one or more notarizations that are acceptable to the recipient associated with the recipient record 404. The list of accepted certification regimes 418 identifies a corresponding number of certification regime records, and the list of preferred notarization types 420 identifies a corresponding number of notarization records.

The certification regime record 406 includes a certification name 422, a certification type 424, and a set of certification parameters 426. The certification name 422 is a human readable name that identifies the particular certification regime. The certification type 424 and the set of certification parameters 426 are used by a data certification service to acquire and apply the data certification to a particular set of data. In some examples, the certification type 424 indicates that the certification regime is a digital signature applied by the data notarization service. In another example, the certification type 424 indicates that the certification regime is applied by a remote service, and the set of certification parameters 426 identifies remote service and provides any necessary parameters for applying the certification. In yet another example, the certification type 424 indicates that the certification regime is applied by executing a set of instructions, and the set of certification parameters 426 identifies a set of instructions that are executed to acquire and apply the certification to the data.

The notarization record 408 includes a notarization name 428, a notarization algorithm 430, and a notarization key 432. The notarization name 428 is a human readable name that identifies the notarization record 408. Notarization algorithm 430 identifies the signing algorithm that is used to apply the notarization to the data being notarized. The notarization key 432 contains a cryptographic key used to apply notarization. A data notarization service uses the information in the notarization algorithm 430 in the notarization key 432 to apply a notarization to certified data. In some implementations, the notarization algorithm 430 is an enumeration field where individual values of the enumeration field correspond to individual types of notarizations. The notarization key 432 contains a cryptographic key corresponding to the notarization algorithm 430. In some examples, the notarization algorithm 430 identifies a cryptographic hash function, and the notarization key 432 contains a cryptographic key compatible with the cryptographic hash function and associated with the data notarization service. In some implementations, the notarization record 408 includes a notary identifier. The notary identifier that includes information that allows the data notarization service to discover the notarizing entity, such as a uniform resource locator.

Figure 5:
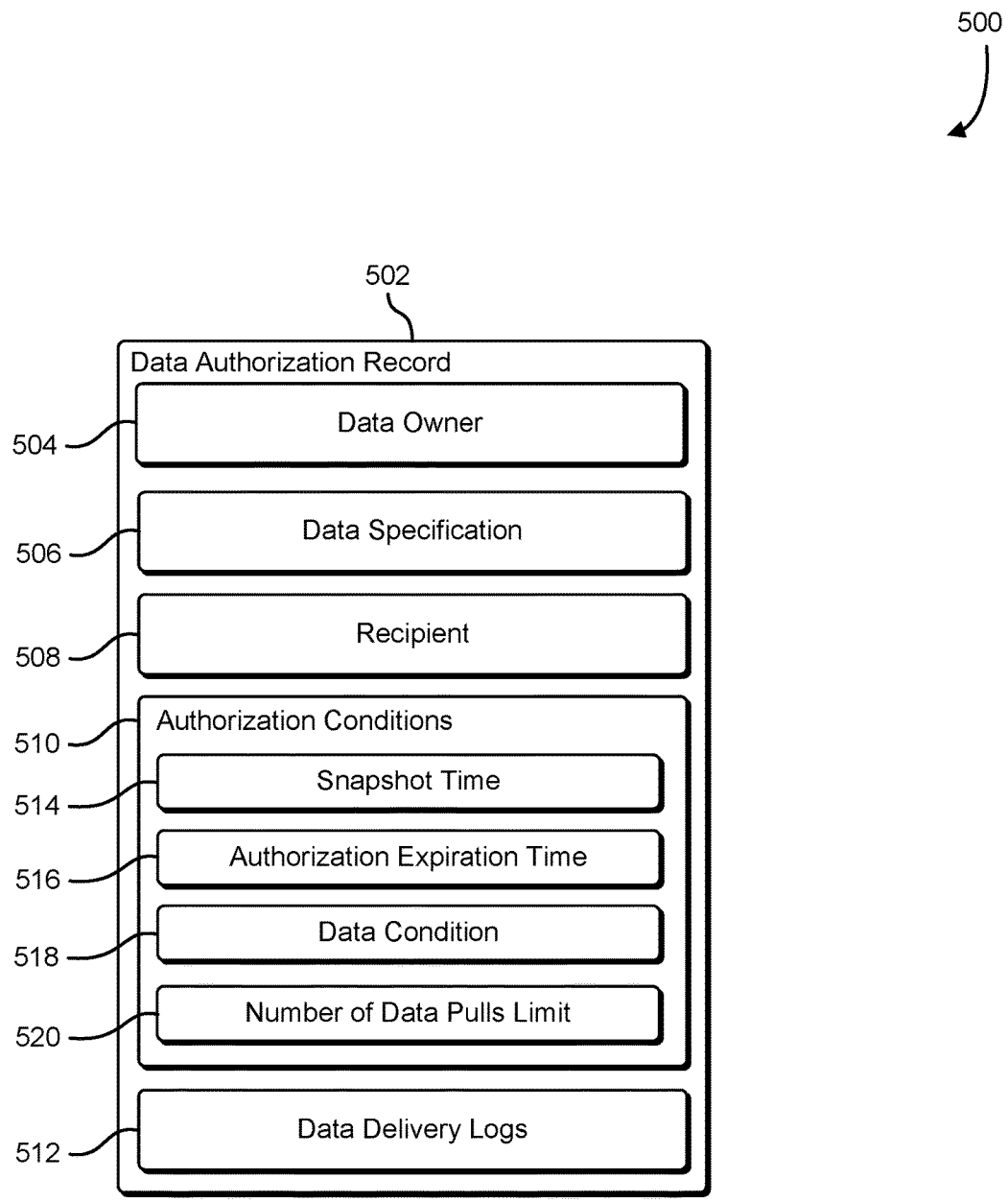
FIG. 5 shows an illustrative example of a data structure used by a data provider to retain data-authorization information.

FIG. 5 shows an illustrative example of a data structure used by a data provider to retain data-authorization information. A data diagram 500 shows a structure for a data authorization record 502. The data authorization record 502 includes a data owner field 504, a data specification field 506, a recipient field 508, a set of authorization conditions 510, and a set of data delivery logs 512. The data owner field 504 is a name, key, username, user ID, or other identifier that identifies a data owner or other responsible entity that is providing the data authorization associated with the data authorization record 502. The data specification field 506 contains information that identifies the data to be provided to the intended recipient. In some examples, the information is a list of filenames, file pointers, or directories. In another example, the information is a pointer or reference to addressable block storage, and an associated data length. The recipient field 508 identifies the intended recipient for the data. The recipient may be identified with the username, user ID, or name. In some implementations, the recipient field 508 identifies the intended recipient by identifying an established secure network connection to the intended recipient over which a request for data was received from the intended recipient. For example, an intended recipient establishes a TLS network connection to a data notarization service, submits a request for data with certification and notarization preferences, and the data notarization service identifies the intended recipient by identifying the TLS network connection over which the request for data was received.

In some examples, the data notarization service stores a record of data deliveries in the data delivery logs 512. When the data notarization service provides notarized and certified data to a recipient that is authorized by the data authorization record 502, the data notarization service adds a record of the event to the data delivery logs 512. The data owner specified by the data owner field 504 is able to retrieve the information in the data delivery logs 512 and determine when the data was provided and where the data was sent.

The set of authorization conditions 510 specifies one or more conditions that limit, qualify, or restrict the data authorization represented by the data authorization record

502. The set of authorization conditions 510 includes a snapshot time 514, and authorization expiration time 516, a data condition 518, and a number of data pulls limitation 520. The snapshot time 514 identifies a point in time at which the data specified by the data specification field 506 is captured and saved by the data notarization service. The data notarization service applies the certifications and notarizations to the saved data, and the notarized and certified saved data is provided to the intended recipient even if the data identified in the data specification field 506 changes after the time indicated by the snapshot time 514. If the snapshot time 514 is empty, or is at a time in the future from the current time, the data notarization service retrieves, certifies, and notarizes the data at the time the request for data is received from the intended recipient. The authorization expiration time 516, when present, identifies a time at which the authorization represented by the data authorization record 502 expires. If request for data is received after the expiration time, the data authorization record 502 may not be used to authorize providing the requested data.

The data condition 518 may include one or more conditions on the data provided. For example, the one or more conditions may specify a maximum amount of certified and notarized data that may be provided to the recipient. In another example, the one or more conditions may specify certain types of data may not be provided to the recipient. In yet another example, the data condition may identify specific data that, when present in the data to be provided, causes the authorization to be canceled and the request for data to be denied. A data owner may use such condition to cancel the authorization if the data to be provided contains information that is damaging, disparaging, or otherwise harmful to the data owner. The harmful information may include missed payments, legal judgments, convictions, driving violations, late payments, or unfavorable customer feedback. The number of data pulls limitation 520 is a number that limits the number of times the authorization may be used to provide data to a recipient. When present, the data notarization service determines whether the data has exceeded the limitation by examining the data delivery logs 512. If the information in the data delivery logs 512 indicates that the number of data pulls limitation 520 has been met, the authorization represented by the data authorization record 502 is revoked and the associated request for data is denied.

In some examples, the data condition 518 may include one or more conditions that limit the number of failed certifications. In some implementations, the one or more conditions specify that if the notarization service attempts to acquire a particular certification for a piece of data, and the certification authority denies the particular certification, the request for certified data is denied by the notarization service. In another implementation, the notarization service selects a set of certifications to attempt to acquire. If one or more of the selected certifications is rejected by a corresponding certification authority, the notarization service identifies a set of substitute certifications that are required to overcome the rejected certification request. The set of substitute certifications may be based at least in part on the identity of the particular rejected certification.

Figure 6:
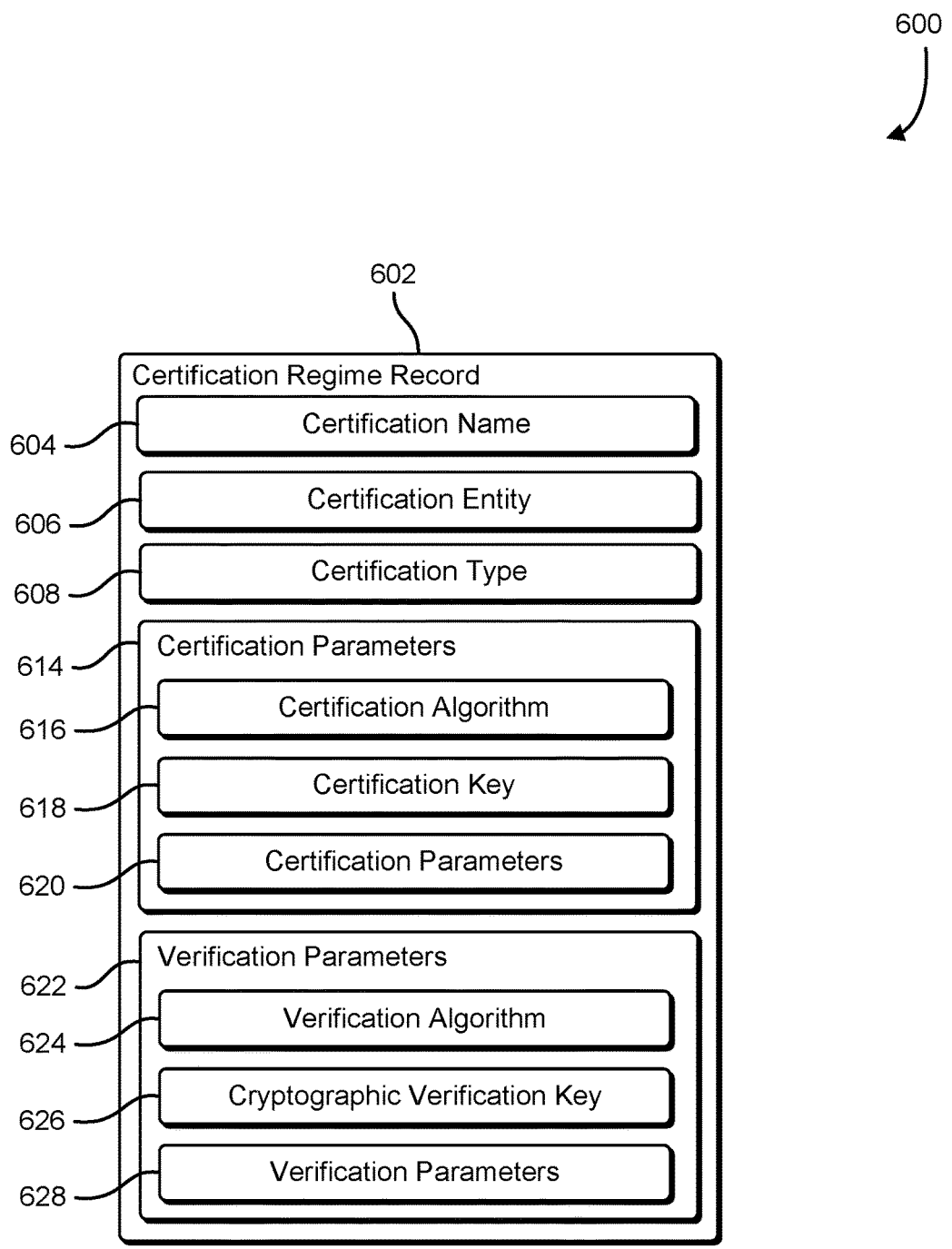
FIG. 6 shows an illustrative example of a data structure used by a data provider to retain information that describes data-certification regimes.

FIG. 6 shows an illustrative example of a data structure used by a data provider to retain information that describes data-certification regimes. A data diagram 600 shows a data structure of a certification regime record 602. The certification regime record 602 is used by a data notarization service to hold information that describes how to acquire and verify particular certifications. The certification regime record 602 includes a certification name 604, a certification entity 606, a certification type 608, a set of certification parameters 614, and a set of verification parameters 622. The certification name 604 contains information identifying human readable string used to describe the certification regime represented by the certification regime record 602. The certification entity 606 identifies an entity that is responsible for the certification. In various examples, the certification entity 606 may be a URL associated with a certification service, a reference to a certification procedure, or information that identifies an individual, corporation, or government entity. The certification type 608 contains information that identifies the type of signature that is added to the requested data when the certification is applied. In various examples, the certification type 608 may specify that the signature is a cryptographic signature, a checksum, an S signature, a confirmation code, a digital watermark, or an associated receipt, seal, or certification document.

In some examples, the set of verification parameters 622 include parameters that allow the notarization service to determine whether a particular certification has been revoked for a particular piece of data. In order to verify a particular certification for a particular piece of data, the notarization service contacts the certification entity, and requests that the certification entity verify that the information indicating that the certification of the data is valid. If the certification entity determines that the information indicating the certification is no longer valid, the certification entity indicates, to the notification service, that the certification of the data has been revoked. If the certification has been revoked, the notification service may remove the certification from the data, and notify the data owner, and/or the data recipient.

The set of certification parameters 614 hold information used by the data certification service to apply the certification associated with the certification regime record 602. The set of certification parameters 614 includes certification algorithm 616, a certification key 618, and certification parameters 620. The certification algorithm 616 identifies an algorithm used to apply certification to the requested data. The certification algorithm 616 may be an enumerated identifier, a name, a procedure name, a function pointer, or a service identifier usable by the certified data provider to generate a certification signature. The certification key 618 is a cryptographic key, seed value, or digital certificate used by the signing algorithm to generate the certification signature. The certification parameters 620 may include other information used by the signing algorithm such as seed values, key lengths, algorithm versions, or other parameters used by the signing algorithm. In some examples, the certification parameters may include block chain parameters including a pointer to a block chain, a location within the block chain, an associated cryptographic hash and algorithm, and a link to associated transaction information.

The set of verification parameters 622 hold information used by the data certification to verify that the certification associated with the certification regime record 602 is valid. The set of verification parameters 622 includes a verification algorithm 624, a cryptographic verification key 626, and a set of verification parameters 628. The verification algorithm 624 may identify a signature type, a procedure name, function pointer, a service identifier, or procedure that identifies a verification algorithm capable of validating the certification associated with certification regime record 602. The cryptographic verification key 626 holds a cryptographic key such as a public key that may be used by the verification algorithm. The set of verification parameters

628 may include other information used by the verification algorithm such as seed values, key lengths, algorithm versions, or other parameters.

Figure 7:
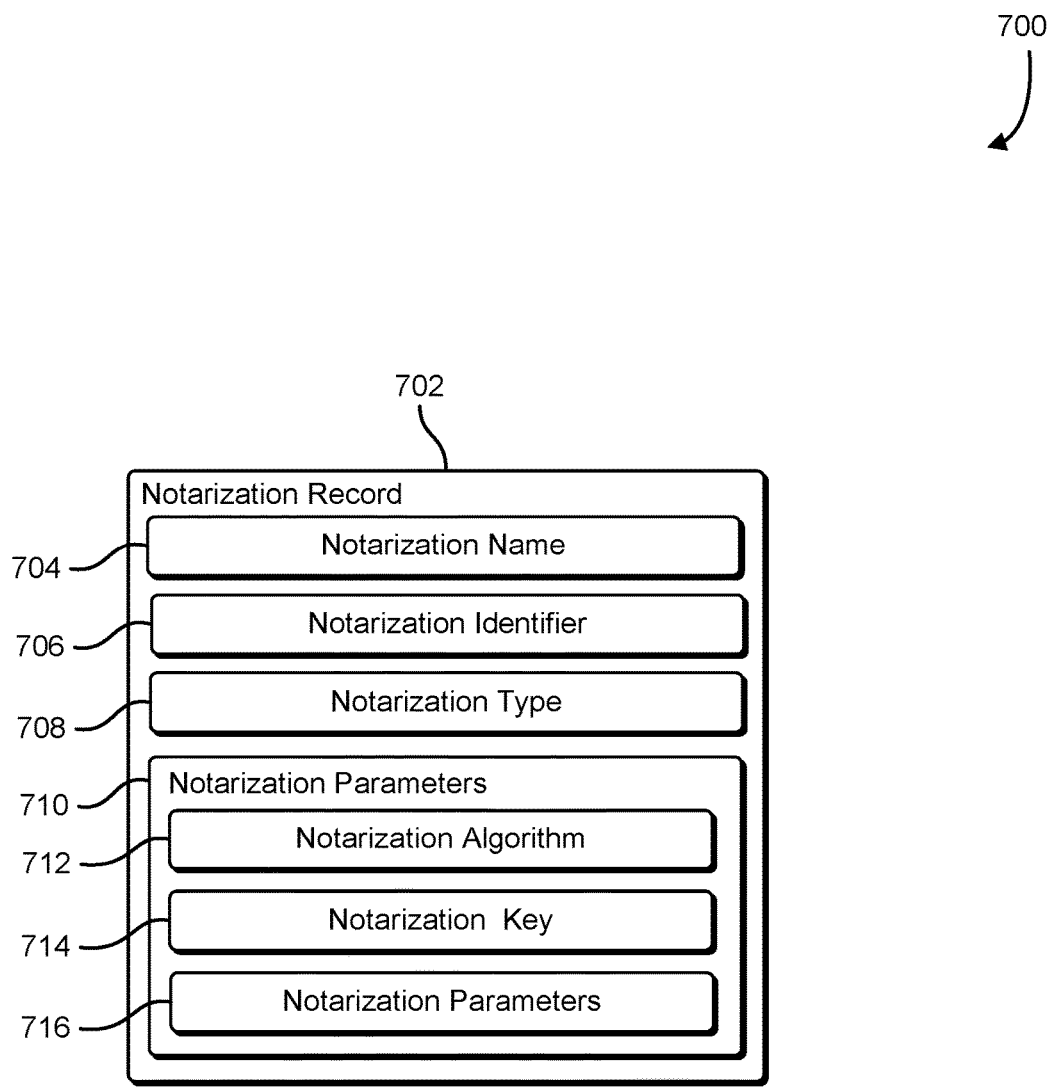
FIG. 7 shows an illustrative example of a data structure used by a data provider to retain information that describes data-notarization types.

FIG. 7 shows an illustrative example of a data structure used by a data provider to retain information that describes data-notarization types. A data diagram 700 shows a data structure of a notarization record 702. The notarization record 702 contains information that describes how a particular notarization may be applied to data by a data notarization service. The notarization record 702 includes a notarization name 704, a notarization identifier 706, a notarization type 708, and a set of notarization parameters 716. The notarization name 704 contains information identifying a human readable string that is used to describe the notarization represented by the notarization record 702. The notarization identifier 706 is a number, string, pointer, key value, or other identifier that is used by the data notarization service to identify the type of notarization. The notarization type 708 contains information that identifies a type of notarization that is added to the requested data when a notarization is applied. In various examples, the notarization type 708 may specify that the signature is a cryptographic signature, a checksum, an S signature, a confirmation code, a digital watermark, or an associated receipt, seal, or certification document. In some implementations, the notarization signature record 702 includes a notarization entity name, a notary chain of trust, and a verification path. The notarization entity name contains an identifier, string, or token that is associated with the notarizing entity. The notary chain of trust includes a cryptographic proof of identity for the notarizing entity. In some examples, the notary chain of trust contains information that links a digital signature of the notarizing entity to a parent certificate authority ("CA"). The verification path specifies the location of information that may be used by the notarization service to confirm the trust relationship with the notary. In various examples, the verification path is a URL, a block chain, a file name, a file handle, an address, or a file path.

The set of notarization parameters 716 include information used by the data certification service to apply the notarization associated with the notarization record 702. The set of notarization parameters 716 includes sig notarization ning algorithm 718, a notarization key 720, and notarization parameters 722. The notarization algorithm 718 identifies an algorithm used to apply a notarization to the requested data. The notarization algorithm 718 may be an enumerated identifier, a name, a procedure name, a function pointer, or a service identifier usable by the certified data provider to generate a notarization. The notarization key 720 is a cryptographic key, seed value, or digital certificate used by the signing algorithm to generate the notarization. The notarization parameters 722 may include other information used by the signing algorithm such as seed values, key lengths, algorithm versions, revocation lists or other parameters used by the signing or verification algorithm.

Figure 8:
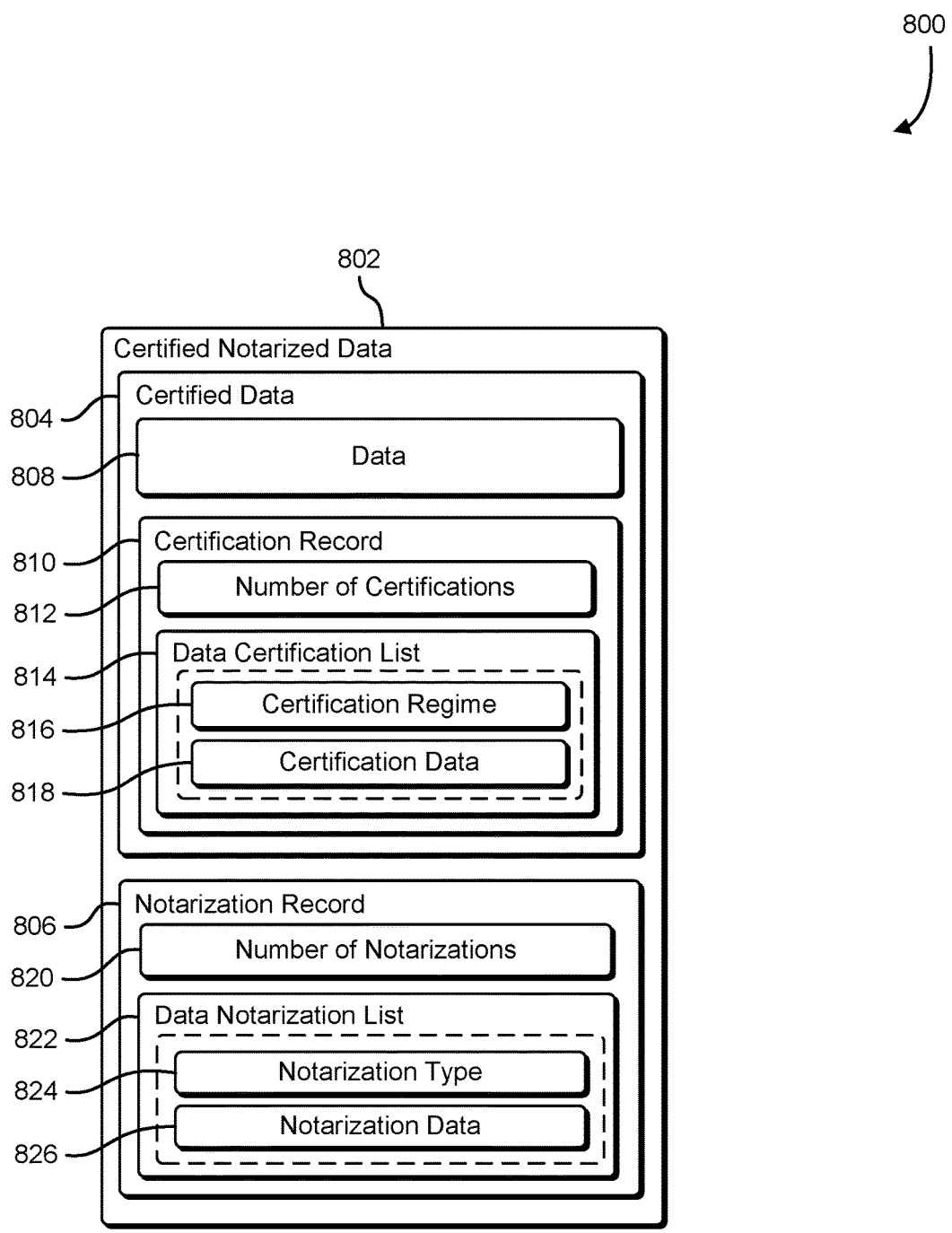
FIG. 8 shows an illustrative example of data certifications and notarizations that are applied to data provided to a data recipient.

FIG. 8 shows an illustrative example of data certifications and notarizations that are applied to data provided to a data recipient. A data diagram 800 shows a data structure for a certified notarized data record 802. A data notarization service uses the structure of the certified notarized data record 802 to assemble and provide certified notarized data to one or more recipients. The certified notarized data record 802 includes the certified data record 804 and a notarization record 806. The certified data record 804 includes a data field 808, and a certification record 810. The data field specifies the data that is certified and notarized. In some examples, the data field 808 includes the particular data that is certified and notarized. In another example, the data field 808 includes a reference to the data such as a filename, file pointer, URL, index, file handle, or other identifier usable by a recipient of the data to retrieve the data associated with the certifications and notarizations contained in the certified notarized data record 802.

The certification record 810 includes a number of certifications 812, and a data certification list 814. The data certification list 814 includes one or more certification entries, each certification entry having a certification regime 816, and a certification data 818. The number of certifications 812 is an integer that specifies the data certification list 814 is a logical container that contains a list of certification entries. The logical container may be implemented as a linked list, an array, a hash table, a stack, or other organized data structure. For each certification entry, the certification regime 816 identifies a certification regime record such as that shown in FIG. 6. The certification regime record provides information that describes how to apply and verify particular certifications to particular data. For each certification entry, the certification data 818 holds the data representing the certification of the data. In various examples, the certification data 818 is the value of the digital signature, and image of a written signature, a code or certification number provided by government agency, or other information that indicates certification of the data referenced by the data field 808.

The notarization record 806 includes a number of notarizations 820, and a data notarization list 822. The number of notarizations 820 holds a value that indicates a number of notarization entries in the data notarization list 822. In various implementations, the data notarization list may be a list, array, hash table, database table, or other data structure capable of holding a number of notarization entries. Each notarization entry in the data notarization list 822 includes a notarization type 824 and a notarization data 826. The notarization type 824 holds information that identifies a notarization record such as the example shown in FIG. 7. The notarization record contains information that describes how a notarization is generated, applied, and verified for the certified data record 804. The notarization data 826 holds the information associated with the notarization. In various examples, the notarization data 826 may be a digital signature, and image of a written signature, a name of a notarizing entity, a certification number of the notarizing individual, or other information indicating the notarization of the certified data referenced by the certified data record 804.

Figure 9:
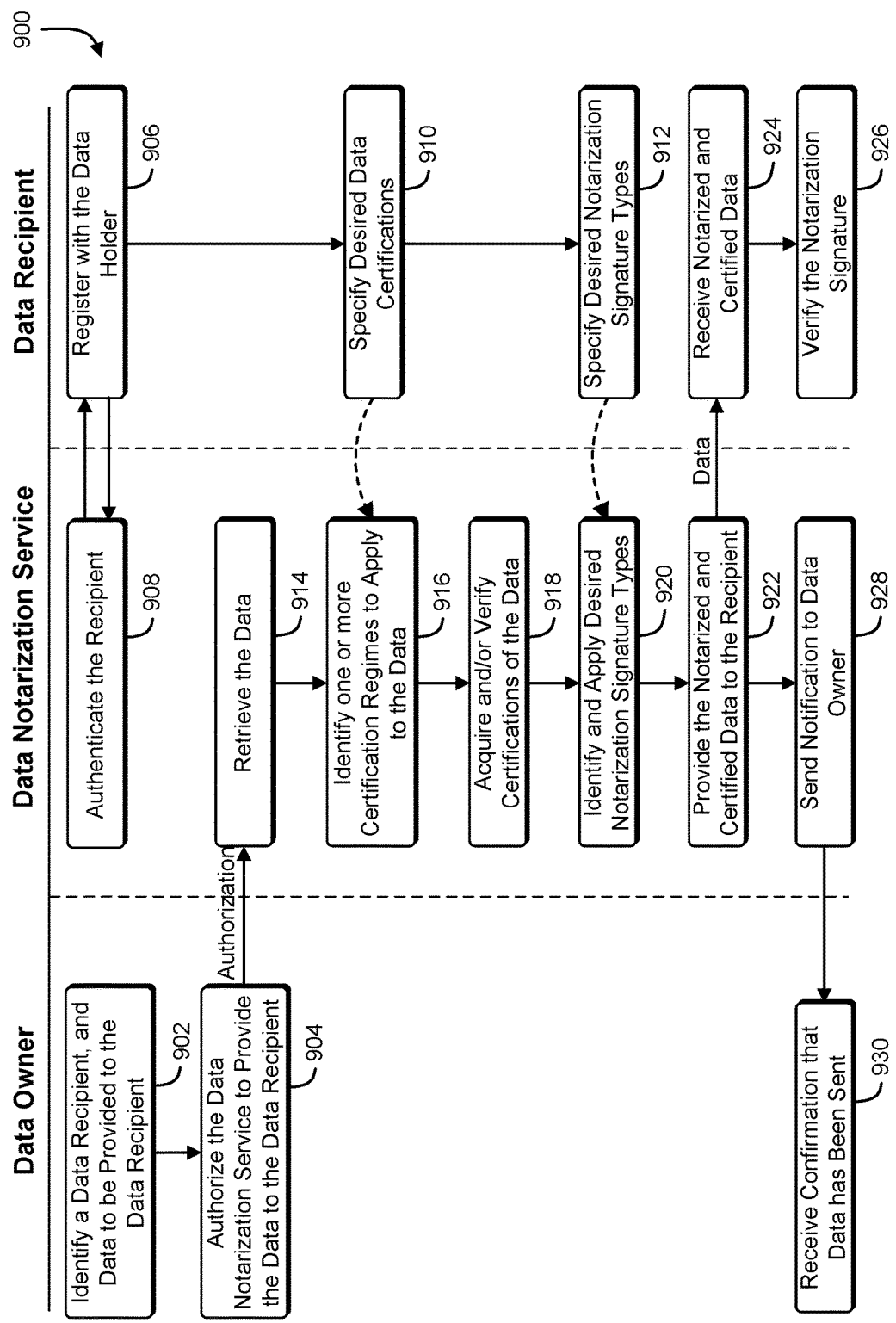
FIG. 9 shows an illustrative example of a process that, as a result of being performed by a data owner, a data notarization service, and a data recipient, provides certified and notarized data to the data recipient in response to a request from the data owner.

FIG. 9 shows an illustrative example of a process that, as a result of being performed by a data owner, a data notarization service, and a data recipient, provides certified and notarized data to the data recipient in response to a request from the data owner. A swim diagram 900 shows a process that begins at block 902 with the data owner or other controlling entity identifying data to be provided to the data recipient. The data to be provided is retained by the data notarization service, and may be financial data, business data, customer data, inventory information, or other data associated with the data owner. At block 904, the data owner generates an authorization that authorizes the data notarization service to provide the data to the data recipient. The authorization may be arranged in an authorization record such as the authorization record shown in FIG. 5. The authorization includes information that authenticates the data owner, identifies the data, and specifies the identity of the data recipient. The authorization is provided to the data notarization service.

Before the data is provided to the data recipient, the data recipient registers with the data notarization service. At block 906, the data recipient generates a registration request that includes information that identifies the data recipient. The registration request is submitted to the data notarization service. At block 908, the data notarization service receives the registration request and authenticates the data recipient. The data notarization service sends a confirmation of registration to the data recipient. At block 910, the data recipient provides the data notarization service with a set of data certification preferences. At block 912, the data recipient provides the data notarization service with a set of data notarization preferences. The data notarization service receives the certification preferences and the notarization preferences, and retains the certification and notarization preferences in a data store with the registration information of the data recipient.

At block 914, the data notarization service receives the authorization from the data owner. The data notarization service authenticates the identity of the data owner, and examines the authorization to determine whether the authorization permits the data specified by the data owner to be provided to the data recipient. If the authorization provided by the data owner does not allow the data to be provided to the data recipient due to a condition, expiration, or other reason, the data notarization service sends a rejection to the data owner denying the request to send certified data to the data recipient. If the authorization provided by the data owner does allow the data to be provided to the recipient, the data notarization service retrieves the data specified in the authorization. The data may be retrieved from a local storage device, a remote storage service, an off-line backup service, a memory device, or other storage device.

At block 916, the data notarization service selects one or more certifications to acquire and apply to the data that will be provided to the data recipient. The certifications are selected by determining the set of certifications that are supportable by the data notarization service and accepted by the data recipient. In some examples, the data recipient specifies a preference order associated with the certification preferences, and the selection of the certifications is based at least in part on the preference order specified by the data recipient. At block 918, for each selected certification, the data notarization service retrieves data certification information from a data store maintained by the data notarization service. Using the certification information, the data notarization service acquires each selected certification for the data, and adds each selected certification to the data that will be provided to the data recipient. For some certifications, the data notarization service provides the data to a third-party, and the third party returns the certification to the data notarization service. After receiving the certification from the third-party, the data notarization service verifies that the certification provided by the third party is valid.

At block 920, the data notarization service selects one or more notarizations to apply to the data that will be provided to the data recipient. The notarizations are selected by determining the set of notarizations that are both supportable by the data notarization service and accepted by the data recipient. If the recipient specifies a preference order associated with the notarization preferences, the selection of the notarizations is based at least in part on the preference order specified by the data recipient. For each selected notarization, the data notarization service retrieves data notarization information from the data store maintained by the data notarization service. Using the notarization information, the data notarization service applies each selected notarization to the certified data to be sent to the data recipient.

At block 922, the data notarization service provides the notarized and certified data to the data recipient. The notarized and certified data may be provided to the data recipient in the form of a certified and notarized data record such as that shown in FIG. 8. The data recipient receives the notarized and certified data at block 924. After receiving the data, the data recipient examines the notarizations provided by the data notarization service, and verifies 926 the notarizations. In some examples, the notarizations may be verified using a public cryptographic key associated with the data notarization service. After providing the notarized and certified data to the data recipient, the data notarization service sends 928 the notification to the data owner. The data owner receives the notification at block 930. The notification indicates to the data owner that the data has been certified and notarized and provided to the data recipient. In various implementations, the notarization may be implemented using a text message, an email, a message submitted to a data logging service, or a return value provided in response to the data owners' submission of the authorization.

Figure 10:
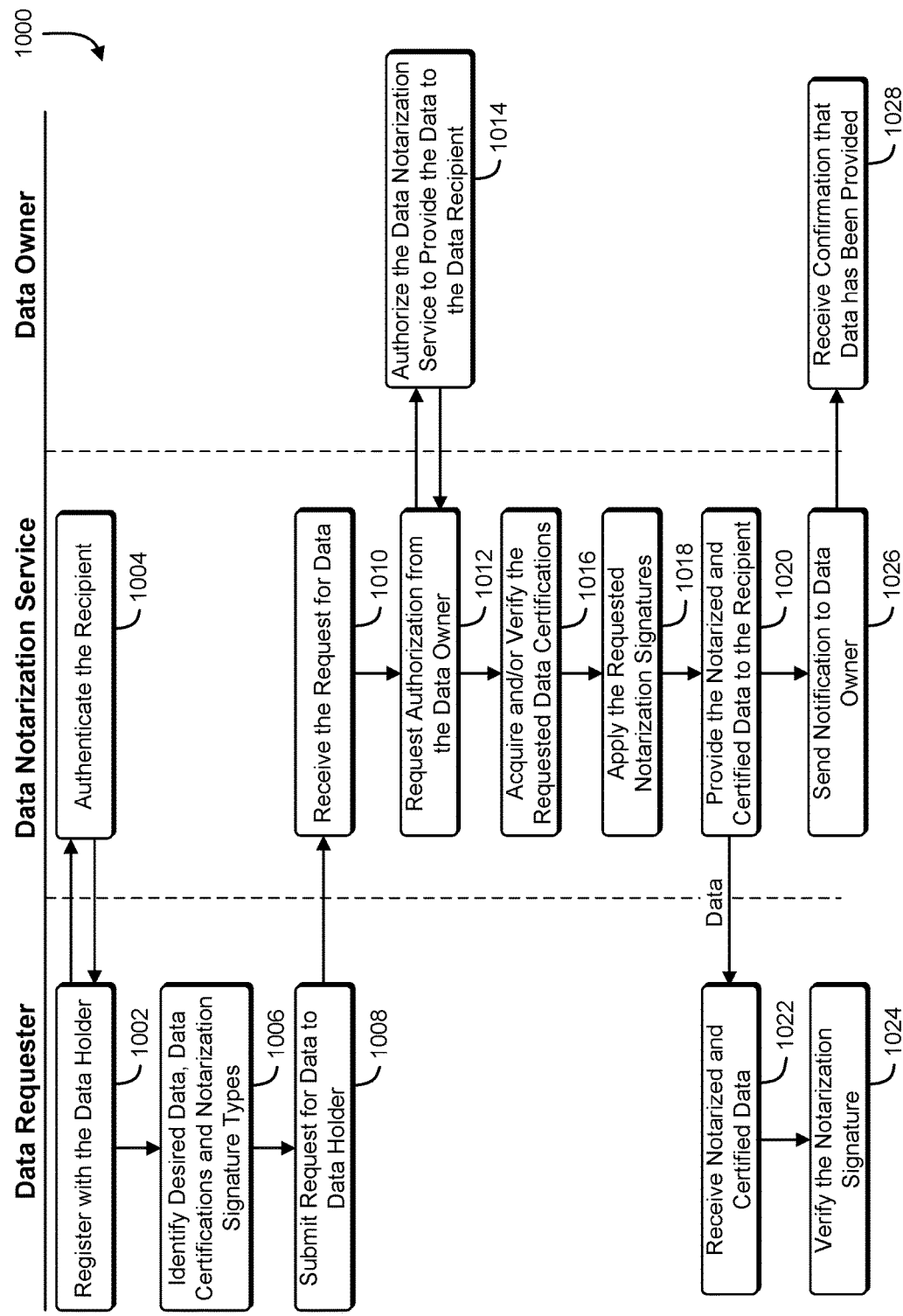
FIG. 10 shows an illustrative example of a process that, as a result of being performed by a data requester, a data notarization service, and a data owner, provides certified and notarized data to the data requester in response to a data request submitted by the data requester.

FIG. 10 shows an illustrative example of a process that, as a result of being performed by a data requester, a data notarization service, and a data owner, provides certified and notarized data to the data requester in response to a data request submitted by the data requester. A swim diagram 1000 illustrates a process that begins at block 1002 with the data requester submitting a registration request to the data notarization service. The registration request includes information that identifies the data requester. At block 1004, the data notarization service receives the registration request and authenticates the data requester. The data notarization service sends a confirmation of registration to the data requester. At block 1006, the data requester identifies data to be requested, and identifies a set of certifications and notarizations to be applied to the requested data. In some examples, the data requester identifies a plurality of acceptable certifications, and a minimum number of certifications to be applied to the requested data. In another example, the data requester identifies a plurality of certifications, and a preference order of certifications. In yet another example, the data requester identifies a plurality of certifications, an associated weight awarded to each of the plurality of certifications, and a minimum total certification weight that is acceptable to the data requester. In addition, the data requester may include a preference order, minimum number of notarizations, and notarization weights. At block 1008, the data requester submits a request for data, including the certification and notarization preferences to the data notarization service.

At block 1010, the data notarization service receives the request for data from the data requester, and stores the certification and notarization preferences of the requester in a data store maintained by the data notarization service. At block 1012, the data notarization service retrieves the data identified in the request for data submitted by the data requester, and identifies a data owner as an entity able to authorize the request to provide the data. The data notarization service sends a request for authorization to the data owner. The request for authorization identifies the data requester, the data requested, and in some examples, the certifications and notarizations required by the data requester. If the data owner determines to approve the request, the data owner generates 1014 an authorization record. The authorization record may include one or more conditions of the authorization. In some implementations, the authorization record is constructed in accordance with the data structure illustrated in FIG. 5. The authorization record is returned from the data owner to the data notarization service. Using the information in the authorization record, the data notarization service determines whether the request submitted by the data requester is allowable. If the data notarization service determines that the request submitted by the data requester does not violate a condition of the authorization, execution advances to block 1016.

At block 1016, the data notarization service selects one or more certifications to acquire and apply to the data that will be provided to the data requester. The certifications are selected by determining the set of certifications that are supportable by the data notarization service and accepted by the data requester. If the data requester has specified a preference order associated with the certification preferences, the data notarization service selects the most preferred certifications from the set of mutually acceptable data certifications. For each selected certification, the data notarization service retrieves data certification information from a data store maintained by the data notarization service. Using the certification information, the data notarization service acquires each selected certification for the data, and adds each selected certification to the data that will be provided to the data requester. In order to acquire some certifications, the data notarization service provides the data to a third-party, and the third party returns the certification to the data notarization service. After receiving the certification from the third-party, the data notarization service verifies that the certification provided by the third party is valid, and adds the certification to the requested data.

At block 1018, the data notarization service selects one or more notarizations to apply to the data that will be provided to the data requester. The notarizations are selected by determining the set of notarizations that are both supportable by the data notarization service and accepted by the data requester. If the requester specifies a preference order associated with the notarization preferences, the selection of the notarizations is based at least in part on the preference order specified by the data requester. For each selected notarization, the data notarization service retrieves data notarization information from the data store maintained by the data notarization service. Using the notarization information, the data notarization service applies each selected notarization to the certified data to be sent to the data requester.

At block 1020, the data notarization service provides the notarized and certified data to the data requester. The notarized and certified data may be provided to the data recipient in the form of a certified and notarized data record such as that shown in FIG. 8. The data requester receives the notarized and certified data at block 1022. After receiving the data, the data requester examines the notarizations provided by the data notarization service, and verifies 1024 the notarizations. In some examples, the notarizations may be verified using a public cryptographic key associated with the data notarization service. After providing the notarized and certified data to the data requester, the data notarization service sends 1026 the notification to the data owner. The data owner receives the notification at block 1028. The notification indicates to the data owner that the data has been certified, notarized, and provided to the data recipient. In various implementations, the notarization may be implemented using a text message, an email, or a message submitted to a data logging service.

In some examples, the data notarization service is authorized to acquire and apply certifications on behalf of a third-party custodian of the data. In some implementations, the third-party custodian of the data supplies the data to the notarization service directly. In other implementations, the third-party custodian of the data supplies credentials to the notarization service, and the notarization service uses the credentials to access a data storage service such as an online storage service to retrieve the data. The third-party custodian of the data provides the data notarization service with an authorization that allows the notarization service to obtain and apply certifications on behalf of the third party. The authorization may be a cryptographically verifiable token signed with a private key of the third-party. The notification service verifies the authorization using the public key of the third party. The notarized and certified data provided to the recipient may include the authorization signed by the third-party to indicate that the third-party has granted the notarization service the authority to obtain data certifications on its behalf.

Figure 11:
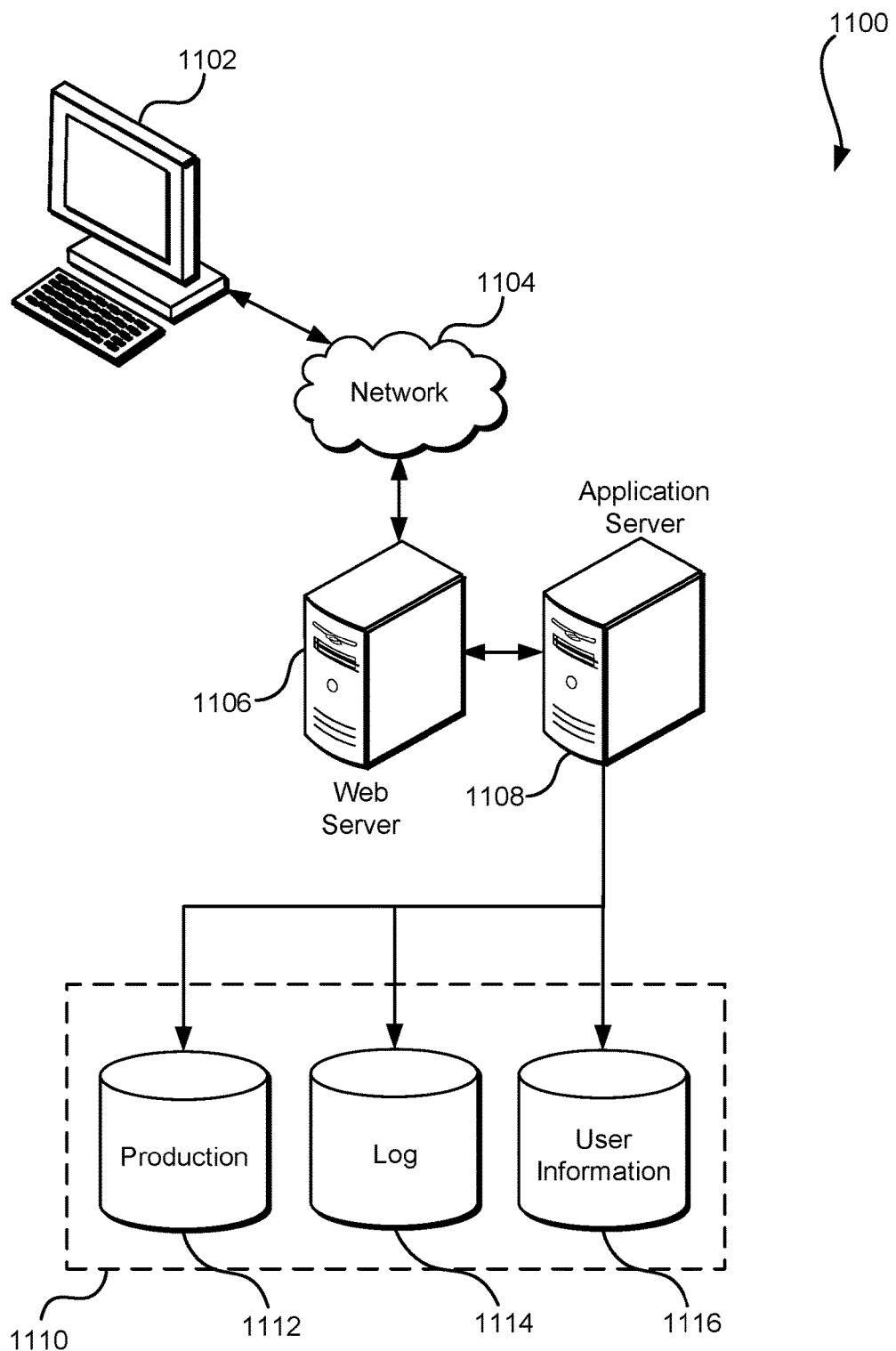
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Example cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, Galois/Counter (GCM) mode.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA), the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital certificates may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, from a device associated with a data owner, an authorization to provide a piece of data to a recipient, the piece of data maintained by one or more computer systems and related to the data owner, the authorization identifying the piece of data, and the authorization identifying a condition on a value of the piece of data, the condition defined by the data owner;
    obtaining the piece of data from a data storage device that is associated with the one or more computer systems and inaccessible to a recipient device;
    obtaining registration information from the recipient, the registration information including a set of certification preferences, a set of notarization preferences, and information that allows the one or more computer systems to verify the identity of the recipient;
    selecting one or more certifications based at least in part on the set of certification preferences specified by the recipient, the one or more certifications capable of confirming a characteristic of the piece of data;
    acquiring certification information that indicates that the piece of data is in compliance with the one or more certifications;
    adding the certification information to the piece of data to produce a certified piece of data;
    applying a notarization to the certified piece of data to produce a piece of notarized certified data, the notarization being a cryptographically verifiable proof of authenticity determined at least in part by the set of notarization preferences specified by the recipient, the notarization allowing the recipient to verify that the certifications have been applied by a computer system associated with a notarizing entity, the cryptographically verifiable proof of authenticity including a digital certificate;
    as a result of determining that the piece of data satisfies the condition defined by the data owner, providing the piece of notarized certified data to the recipient; and
    as a result of determining that an updated version of the piece of data does not satisfy the condition defined by the data owner, revoking the authorization.

2. The computer-implemented method of claim 1, further comprising:
    storing the set of notarization preferences and the set of certification preferences in association with the identity of the recipient in a memory accessible to the one or more computer systems.

3. The computer-implemented method of claim 1, wherein:
    the authorization includes information that describes the condition; and
    the notarized certified data is provided to the recipient as a result of the condition being satisfied.

4. The computer-implemented method of claim 3, wherein the condition is an expiration time for the authorization, a snapshot time before which the data is retrieved, or a required characteristic of the piece of data.

5. A system, comprising at least one computing device having one or more memory and one or more processors, where the at least one computing device implements a data notarization service, wherein the data notarization service:
    determines that an authorization allows a piece of data to be provided to a requester by at least determining that the piece of data satisfies a condition of the authorization, the condition defined by an owner of the data, the piece of data stored in a data storage device that is inaccessible to the requester;
    obtains registration information from the requester, the registration information including a set of certification preferences, a set of notarization preferences, and information that allows for verification of the identity of the requester;
acquires certification information that indicates that the piece of data is certified in accordance with a particular certification, the particular certification based at least in part on the requester and the particular certification selected by the data notarization service based at least in part on the certification preference;
applies a cryptographically verifiable notarization, including a digital certificate, to the certification information and the piece of data to produce cryptographically signed certified data;
provides the cryptographically signed certified data to a device associated with the requester; and
determines that the authorization does not allow an updated piece of data to be provided to the requester by at least determining that the updated piece of data does not satisfy the condition of the authorization.

6. The system of claim 5, wherein:
the data notarization service further obtains a signature preference from the device associated with the requester; and
the cryptographically verifiable notarization is applied to the certification information and the piece of data in accordance with the signature preference.

7. The system of claim 5, wherein:
the data notarization service further obtains a certification preference from the device associated with the requester.

8. The system of claim 5, wherein:
the data notarization service further obtains information that identifies a set of acceptable certifications, and a preference order for the set of acceptable certifications, from the device associated with the requester; and
the particular certification is selected by the data notarization service from the set of acceptable certifications based at least in part on the preference order.

9. The system of claim 5, wherein:
the data notarization service further obtains information that identifies a set of acceptable verifiable signature types, and a preference order for the set of acceptable verifiable signature types, from the device associated with the requester; and
the cryptographically verifiable notarization is applied in accordance with a particular type of verifiable signature selected by the data notarization service from the set of acceptable verifiable signatures based at least in part on the preference order.

10. The system of claim 5, wherein the data notarization service further sends a notification to an owner device indicating that the piece of data has been provided to the requester.

11. The system of claim 5, wherein:
the device associated with the requester establishes a cryptographically protected network connection with the data notarization service;
a request for the piece of data is obtained via the cryptographically protected network connection; and
the data notarization service returns the cryptographically signed certified data to the device via the cryptographically protected network connection.

12. The system of claim 5, wherein the certification information is a cryptographically verifiable digital signature, a digital receipt, a confirmation code, a keyed-hash message authentication code, a token, a proof of work, or an approval number.

13. A non-transitory computer-readable storage medium having stored thereon executable instructions that, as a result of being executed by one or more processors of a computer system, cause the computer system to at least:
determine that a condition that allows a piece of data to be provided to a requester is satisfied, the condition defined by an owner of the data;
obtain a piece of data from a data storage device that is connected to the computer system and inaccessible to a recipient device;
obtain registration information from the requester, the registration information including a set of certification preferences, a set of notarization preferences, and information that allows for verification of the identity of the requester;
acquire certification information that indicates that a piece of data is certified in accordance with a particular certification, the particular certification based at least in part on an identity of an intended recipient and specified by an owner device from a set of certifications identified by a certification preference selected from the set of certification preferences;
add the certification information to the piece of data to produce certified data;
generate a notarization for the certified data, the notarization providing a cryptographically verifiable indication, including a digital certificate, that the piece of data has been certified in accordance with the particular certification;
add the notarization to the certified data to produce notarized certified data;
provide the notarization to the recipient device;
determine that the condition is not satisfied for an updated piece of data; and
deny a request for the updated piece of data.

14. The non-transitory computer-readable storage medium of claim 13, wherein the instructions further comprise instructions that, as a result of being executed by the one or more processors, cause the computer system to:
generate the notarization for the certified data in accordance with a notarization preference specified by the recipient device.

15. The non-transitory computer-readable storage medium of claim 13, wherein:
the certification information indicates that the piece of data is in accordance with a number of certifications; and
the number of certifications is based on a parameter obtained from the recipient device.

16. The non-transitory computer-readable storage medium of claim 13, wherein the instructions further comprise instructions that, as a result of being executed by the one or more processors, cause the computer system to:
store, at a time indicated by an authorization specified by an owner device, a copy of the piece of data in the data storage device; and
after the time indicated by the authorization, and in response to a request for the piece of data submitted by the recipient device:
retrieve the copy of the piece of data from the data storage device;
acquire certification information that indicates that the copy of the piece of data is certified in accordance with the particular certification;
add the certification information to the copy of the piece of data to produce a certified data snapshot;
generate a notarization for the certified data snapshot;

add the notarization to the certified data snapshot to produce a notarized certified data snapshot; and provide the notarized certified data snapshot to the recipient device.

17. The non-transitory computer-readable storage medium of claim 13, wherein:

the instructions further comprise instructions that, as a result of being executed by the one or more processors, cause the computer system to verify that the certification information is valid; and the certification information is added to the piece of data as a result of having verified that the certification information is valid.

18. The non-transitory computer-readable storage medium of claim 13, wherein the instructions further comprise instructions that, as a result of being executed by the one or more processors, cause the computer system to:

generate a second notarization for the certified data; and add the second notarization to the notarized certified data.

19. The non-transitory computer-readable storage medium of claim 13, wherein the instructions further comprise instructions that, as a result of being executed by the one or more processors, cause the computer system to:

determine that the piece of data has been provided more than a threshold number of times; and as a result of having determined that the piece of data has been provided more than a threshold number of times, prevent the piece of data from being provided.

20. The non-transitory computer-readable storage medium of claim 13, wherein the instructions further comprise instructions that, as a result of being executed by the one or more processors, cause the computer system to:

determine whether the piece of data includes information that satisfies a condition specified by an owner device; and as a result of having determined that the piece of data includes information that satisfies a condition specified by the owner device, prevent the piece of data from being provided to the recipient device.

* * * * *